(12) United States Patent
Andresen et al.

(10) Patent No.: US 6,268,859 B1
(45) Date of Patent: Jul. 31, 2001

(54) METHOD AND SYSTEM FOR RENDERING OVERLAPPING OPAQUE GRAPHICAL OBJECTS IN GRAPHIC IMAGING SYSTEMS

(75) Inventors: Kevin W. Andresen, Campbell; Kok S. Chen, Sunnyvale, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/473,651

(22) Filed: Jun. 6, 1995

(51) Int. Cl.[7] ................................................... G06T 15/40
(52) U.S. Cl. ............................................. 345/421; 345/435
(58) Field of Search ...................................... 395/121, 122, 395/135; 345/421, 422, 435

(56) References Cited

U.S. PATENT DOCUMENTS

| | | | |
|---|---|---|---|
| 3,944,997 | * | 3/1976 | Swallow ................................ 395/121 |
| 4,791,579 | * | 12/1988 | Kranitzky ........................ 395/121 X |
| 4,901,252 | * | 2/1990 | Fitzgerald et al. .................... 395/121 |
| 5,075,876 | * | 12/1991 | Seki et al. ............................. 395/121 |
| 5,086,496 | * | 2/1992 | Mulmuley ............................. 395/121 |
| 5,125,074 | * | 6/1992 | Labeaute et al. ..................... 395/121 |
| 5,481,662 | * | 1/1996 | Kouyama et al. .................... 395/135 |
| 5,509,110 | * | 4/1996 | Latham ................................. 395/121 |

* cited by examiner

*Primary Examiner*—Mark Zimmerman
(74) *Attorney, Agent, or Firm*—Burns, Doane, Swecker & Mathis, L.L.P.

(57) ABSTRACT

Objects in an image are rendered in a manner which dynamically avoids the rendering of obscured objects. Data pertaining to one object is stored in a designated memory location, such as a cache memory. Data for a subsequent object is compared with the stored data, and the area of intersection between the two objects is determined. This area of intersection is subtracted from the first object, and the data for the second object is added to the memory. As the memory is filled, the data for the oldest object is removed and the object is rendered. After all objects in the list have been processed in this manner, those which remain in the memory are also rendered, and removed from the memory. At each step of the process, the portions of an object which are obscured by later-generated objects are eliminated, and thereby unnecessary rendering of obscured objects is avoided.

11 Claims, 3 Drawing Sheets

METHOD AND SYSTEM FOR RENDERING OVERLAPPING OPAQUE GRAPHICAL OBJECTS IN GRAPHIC IMAGING SYSTEMS

FIELD OF THE INVENTION

The present invention is directed to imaging systems, and more particularly to the manner in which overlapping opaque graphical objects are rendered to produce an image in output devices for such systems.

BACKGROUND OF THE INVENTION

Image output devices for imaging systems, such as display monitors and printers, operate as raster devices. In these types of devices, the output image comprises a two-dimensional grid of picture elements, or pixels, which is known as a "raster". To generate an image on a screen or a page, these devices store a representation in memory of a display value for each pixel in the image. This stored representation of the image is referred to as a "pixel map" (sometimes abbreviated "pixmap"), or a frame buffer. The display value for each pixel comprises multiple components, e.g. red, green and blue components for a monitor which operates in an RGB color space, or cyan, magenta and yellow components for a printer which operates in a CMY color space.

In the operation of an exemplary imaging system, a user might be running a graphics application program on a computer. The user can instruct the program to draw an object, such as a square, at a particular location on the screen of the display monitor. The user might also designate that the square be filled with a certain color, such as 50% purple. In response to these user inputs, the graphics program issues high-level instructions to the computer's operating system to draw a 50% purple square. A display manager, or similar such portion of the computer's operating system for controlling the operation of the display monitor, interprets the command to draw a 50% purple square into low-level instructions for the display monitor. As part of this interpretation process, the high-level description of the purple square from the application program is translated into individual red, green and blue pixel display values that are stored in the frame buffer. In this particular example, each entry in the frame buffer for a corresponding display pixel that is covered by the square stores value of 50% red, 50% blue and 0% green. If the output device is a printer, corresponding values for cyan, magenta and yellow are stored in the frame buffer.

The process of converting the high-level graphical data into pixel values is known as rendering. In a device which employs a three-dimensional color space, such as RGB or CMY, the frame buffer is comprised of three sections, or planes, which respectively relate to the three components. For each pixel of an image, the rendering process involves the steps of determining the display value for one of the components, e.g. the red component, storing that value at an appropriate location in the corresponding section of the frame buffer, and repeating these steps for each of the other two components. In other words, each of the three color space components is individually rendered for each pixel.

The rendering process requires an appreciable amount of processing power, and hence time, in the overall generation of an image. As a general objective, therefore, it is desirable to optimize the rendering process wherever possible, and thereby improve the efficiency with which images are generated. One area of particular interest in this regard pertains to overlapping graphical objects. Typically, each individual object in an image is separately rendered. For example, if the user creates an image containing three overlapping rectangles, when this image is to be displayed on a monitor or printed on a printer, the first rectangle to have been created by the user is initially rendered, followed by the second rectangle and then the third rectangle. In the areas where the rectangles overlap, the information pertaining to the later-generated rectangle overwrites the pixel data for the earlier-generated rectangle, to account for the opacity of the objects. This procedure, by which later-generated data replaces earlier-generated data, is known as the "painter's algorithm." In essence, data for a later object is "painted over" the data for an earlier object in the frame buffer.

It can be seen that the rendering process is inherently inefficient when overlapping objects are present in the image. Since each object is individually rendered, earlier-generated objects are rendered without consideration of later-generated objects. As a result, any rendering that is carried out with respect to a portion of an object that is obscured by a later-generated object is unnecessary, inefficient and results in wasted processing time. It is desirable, therefore, to avoid rendering portions of objects which are obscured by other objects in an image.

SUMMARY OF THE INVENTION

The present invention provides an optimization for rendering pixels in an image which dynamically avoids the rendering of objects that are obscured in the image. In the implementation of the invention, information pertaining to objects in an image is preferably stored in a suitable form prior to rendering, for example in a display list or a metafile. Image data pertaining to one object is retrieved from the display list and stored in a designated memory location, such as a buffer. Image data for a subsequent object is retrieved from the list and the area of intersection between the two objects is determined. This area of intersection is subtracted from the first object, and the image data for the second object is added to the memory. As the memory is filled, the data for the oldest object is removed and the object is rendered. After all objects in the list have been processed in this manner, those which remain in the memory are also rendered, and removed from the memory.

This approach results in deferred rendering of objects. At each step of the process, portions of an object which are obscured by later-generated objects are removed. As a result, by the time an object is rendered, less of its area, and preferably only the visible portions, remain for processing. The complexity of this approach can be adjusted by varying the size of the memory, e.g. buffer, in which the object data is stored. In a simple implementation, only a single object is stored in the buffer at a time. For even greater simplicity, only particular types of objects, such as rectangles, can be processed in this manner.

Further features of the invention, as well as the advantages attained thereby, are described in greater detail hereinafter with reference to preferred embodiments illustrated in the accompanying drawings.

DETAILED DESCRIPTION

To facilitate an understanding of the present invention, it is described hereinafter in the context of a specific embodiment. In particular, reference is made to the implementation of the invention in a color printer. It will be appreciated, however, that the practical applications of the invention are not limited to this particular embodiment. Rather, the invention can be employed in other types of rasterized color output devices, such as CRT monitors and LCD display screens, as well as in graphics application programs for creating and editing images.

Figure 1:
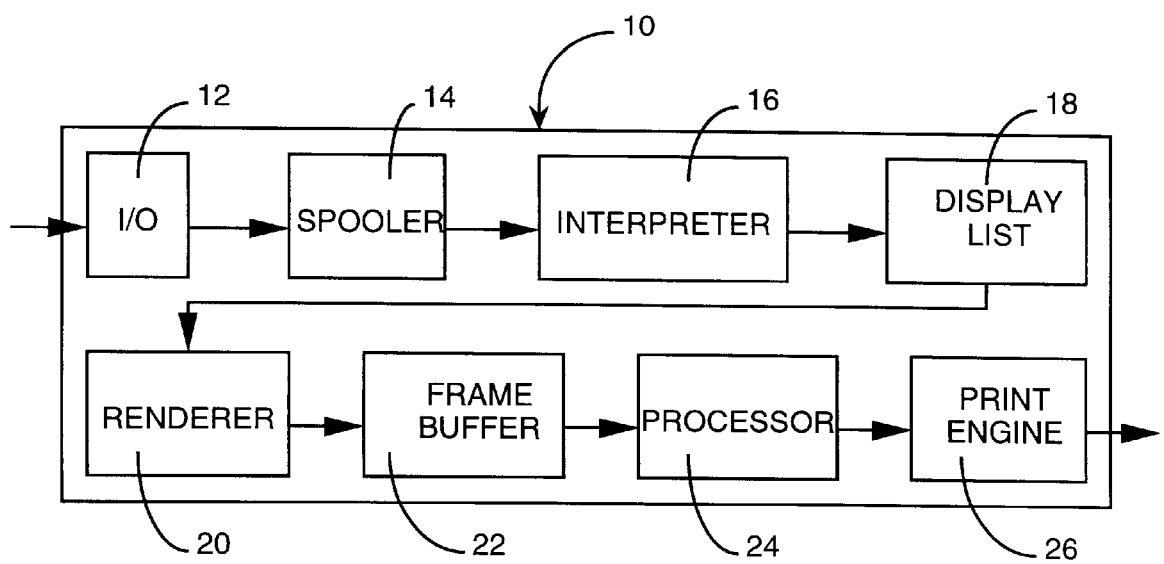
FIG. 1 is a general block diagram of the major subsystems of a printer in which the present invention can be implemented.

FIG. 1 is a block diagram of the major components of a color printer of a type in which the present invention can be implemented. Referring thereto, the printer 10 includes an I/O controller 12 that is connected to one or more I/O ports for communication with computers and other external sources of data to be printed. A spooler 14 accumulates image data received from the external sources, and stores the data until it is ready to be processed for printing. It will be appreciated, of course, that the spooler is optional and can be incorporated in an external device, rather than the printer itself. An interpreter 16 receives the image data and issues calls which cause the desired image to be drawn, or printed, on paper. These calls can be of two basic types. One set of calls identifies the appearance state of objects to be drawn. This appearance state indicates the color of the object, as well as other appearance-related factors, such as patterns or the like. The other set of calls describes the object to be drawn, such as a rectangle, a particular character of text, or the like. In the illustrated embodiment of the printer, these calls are stored in an intermediate form, known as a display list 18, or a metafile.

The information in the display list is provided to a renderer 20. The renderer converts the object-based information from the interpreter 16 into individual pixel display values, which are stored in a frame buffer 22. The pixel display values stored in the frame buffer can undergo optional processing within one or more processors 24. For example, the display values can be compressed and/or decompressed, or undergo halftone processing. Ultimately, these display values are supplied to a print engine 26, to control the actual printing of the desired image. For example, the print engine could be of the laser beam printer type. Alternatively, the print engine could be of the ink jet type.

Figure 2:
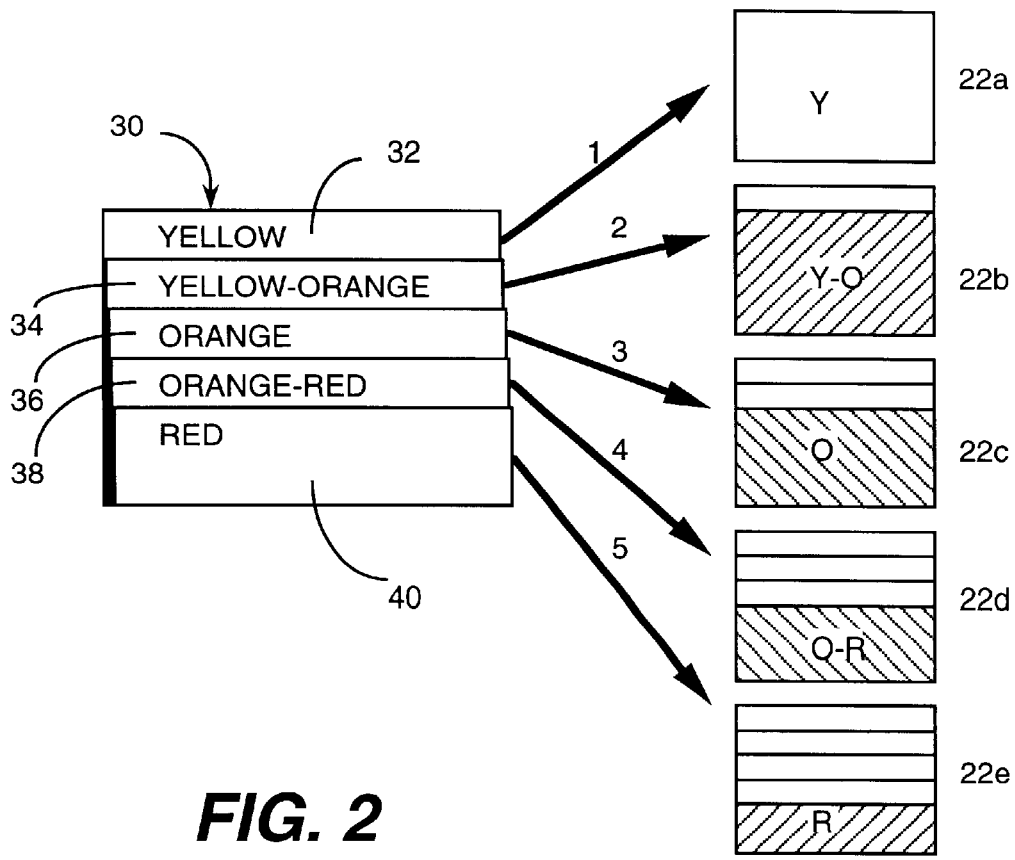
FIG. 2 is a block diagram illustrating the respective steps in the rendering of a gradient object.

The process which is undertaken in the renderer 20 is illustrated in greater detail in FIG. 2. In the illustrated example, an object to be rendered comprises a rectangle 30 with a color gradient that progresses from yellow at the top of the rectangle to red at the bottom. In practice, an object of this type may comprise a series of objects, in this case rectangles. More particularly, the gradient is displayed by drawing a yellow rectangle 32, which is overlaid by a smaller yellow-orange rectangle 34, which is in turn overlaid by a smaller orange rectangle 36, and so on. In FIG. 2, the various rectangles are shown slightly offset from one another, to depict their overlapping relationship. In actual practice, they are aligned to produce the gradient effect.

To render this gradient object, the relevant pixel display values are computed and stored in the frame buffer 22. The state of the frame buffer after each rendering step is represented in FIG. 2 by the reference numbers 22a–22e. In the example of FIG. 2, the frame buffer 22 is illustrated in a single plane. In practice the frame buffer comprises a number of sections, or planes, which respectively correspond to the components of the device's color space. For example, if the printer utilizes cyan, magenta and yellow inks or toners to generate images, it operates in a CMY color space and its frame buffer has three address ranges, e.g., planes, which respectively correspond to these three components. For the sake of simplicity, only one section is depicted in FIG. 2. Also in FIG. 2, only that portion of the frame buffer 22 which corresponds to the rectangle 30 is illustrated. Portions of the frame buffer which store display values for pixels that are not covered by the rectangle 30 are not shown, since they are not affected by the particular example being discussed.

As a first step in the overall rendering process, the yellow rectangle 32 is rendered, and the display values for all of the yellow pixels are stored in the frame buffer, as shown at 22a. In the next step, the yellow-orange rectangle 34 is rendered, and the display values for the affected pixels are stored in the frame buffer, as shown at 22b. In this step, the portion of the frame buffer represented by the shaded area, which originally contained the display values for the yellow rectangle 32, is overwritten with the yellow-orange display information. Only the unshaded portion of the frame buffer still contains the yellow display data.

In the third step, the orange rectangle 36 is rendered, and the display values for the affected pixels are stored in the frame buffer, as shown at 22c. The shaded area represents the portion of previously rendered data which is overwritten by the newly-rendered data for the orange rectangle 36. Only the remaining unshaded pixels contain the yellow-orange and yellow display values from previous rendering steps. In a similar manner, the orange-red rectangle 38 and the red rectangle 40 are rendered, and each time the shaded portion of the frame buffer is overwritten with new data. The final state of the frame buffer is shown at 22e.

The shaded portion of the frame buffer in each of steps 22b–22e represents areas where previously rendered information is overwritten by subsequently rendered data. This overwriting of rendered data represents unnecessary processing steps which, if they can be avoided, result in an increase in the efficiency of the printing process. In accordance with the present invention, such unnecessary rendering steps are eliminated, through suitable preprocessing of the image data prior to rendering. This preprocessing is described with reference to the flowchart of FIG. 3 and an illustrative example depicted in FIGS. 4A–4D. The process depicted in the flowchart of FIG. 3 can be embodied in software which is stored in a memory (not shown) contained in the renderer 20, for example.

Figure 3:
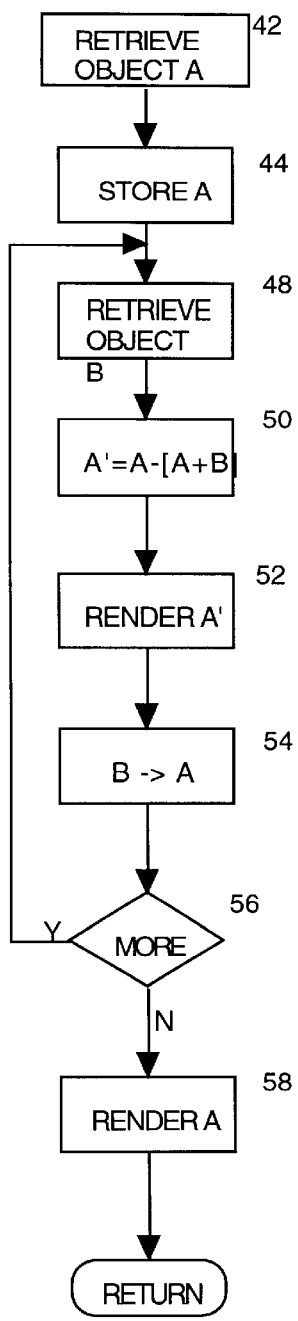
FIG. 3 is a flowchart of a first embodiment of the rendering process in accordance with the present invention.
Figure 4A:
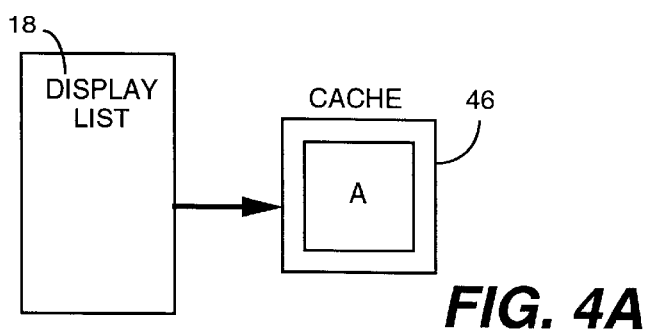
FIGS. 4A–4D are examples of the steps that occur in the process of FIG. 3.
Figure 4B:
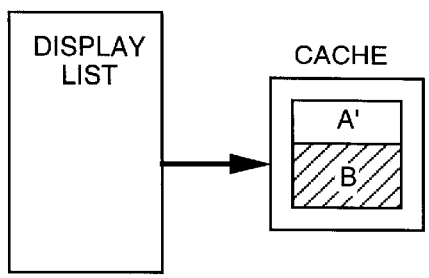
Figure 4C:
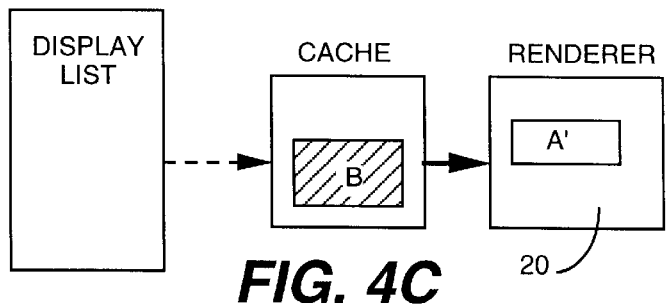
Figure 4D:
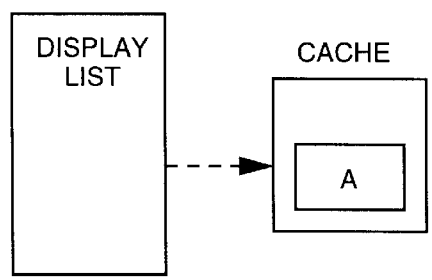

Referring to FIG. 3, data pertaining to the first object in the display list is retrieved at Step 42, and stored at Step 44 in a cache memory 46, or other suitable buffer (see FIG. 4A). For example, the first object in the display list might be the yellow rectangle 32. The data which pertains to it includes its size and location in the image. For a rectangle, this data can be expressed in terms of the locations of the top left and lower right corners of the object. At Step 48, data for the second object B on the display list, for example the orange-yellow rectangle 34, is retrieved. At Step 50, the intersection of the two objects (A+B) is subtracted from the first object A, and the remaining portion of the object A is stored in the cache as a new object A' (FIG. 4B). The object A' is then rendered at Step 52 (FIG. 4C), and the second object B is stored in the cache as new object A, at Step 54 (FIG. 4D).

A determination is then made at Step 56 whether there are additional objects on the display list. If so, the next object is retrieved at Step 48, and the process continues in this manner until all of the objects have been processed and obscured areas have been eliminated from the rendering process. After the last iteration, the cache 44 contains the image data for the last object on the display list. At Step 58, this final object is rendered, to complete the processing of the image data for a page.

The process depicted in the flowchart of FIG. 3 represents a simple implementation of the invention, in which the cache 46 stores the data for one object at a time. In operation, the portions of the stored object which are obscured by the next object on the display list are eliminated, and the object is then rendered. This technique is well-suited for objects such as the gradient rectangle depicted in FIG. 2, in which each successive object overlays the preceding object. It may be the case, however, that a given object may not be obscured by the object which immediately follows it on the display list. Rather, it may be obscured by a different object which is created at a later time by the user.

Figure 5:
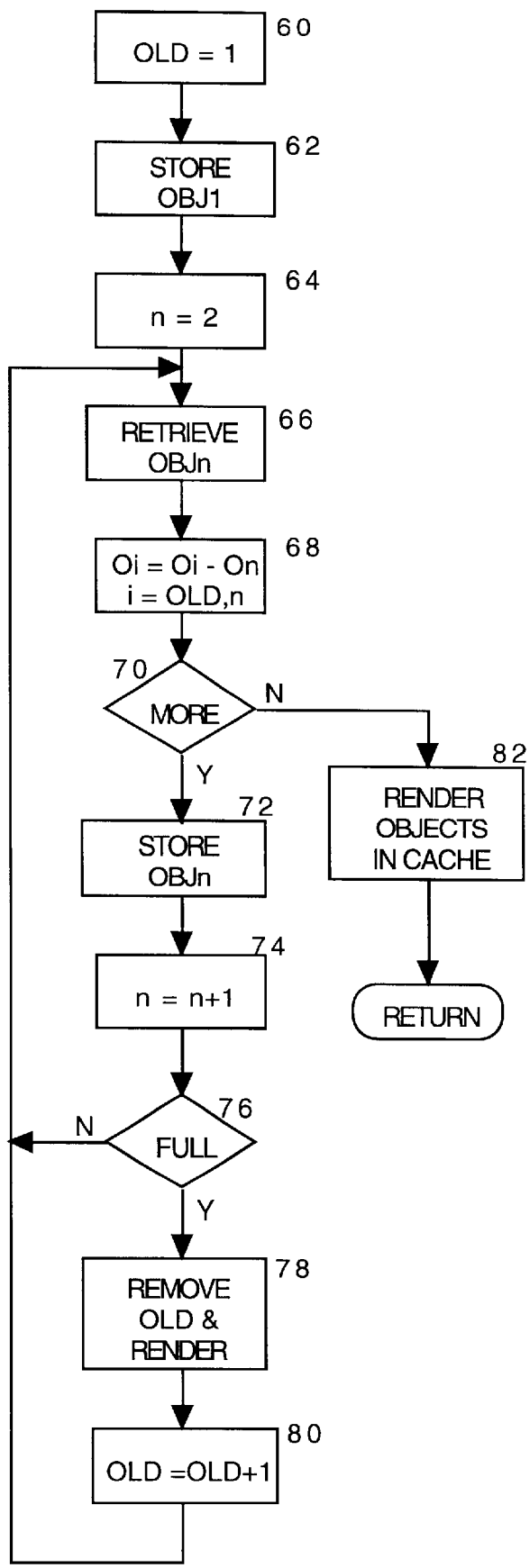
FIG. 5 is a flowchart of an alternate embodiment of the invention.

To accommodate this latter situation, the cache 46 can store data for more than one object at a time. In this situation, an object is not rendered until such time as it becomes necessary to remove that object's data from the cache memory, in order to store data for a new object. A flowchart which depicts the operation for this alternate process is illustrated in FIG. 5. Referring thereto, a pointer which identifies the oldest object to be rendered is initially set to the first object in the display list at Step 60, and this object's data is stored in the cache at Step 62. An index value n is initially set to a value of 2 at Step 64, and the nth object in the display list is retrieved at Step 66. Thereafter, at Step 68, each object of stored in the cache is processed by subtracting the area of its intersection with the newly retrieved nth object On. Thus, in the first iteration, this process is the same as depicted in the flowchart of FIG. 3, in which the first object is processed relative to the second object. After all of the objects in the cache have been processed to determine whether any portions are obscured by the nth object, a determination is made at Step 70 whether there are additional objects on the display list. If so, the nth object is stored in the cache at Step 72 and the index n is incremented at Step 74. A determination is then made at Step 76 whether the cache is full. If not, the next object is retrieved at Step 66, and the processing continues in this manner, to remove portions of objects stored in the cache that are obscured by the newly retrieved object.

Once the cache is determined to be full at Step 76, the oldest object is removed from the cache at Step 78 and rendered, to place its remaining data in the frame buffer 22. The pointer to the oldest object is incremented at Step 80, and the next object is then retrieved at Step 66.

After all of the objects of the display list have been processed in this manner, a determination is made at Step 70 that there are no further objects. At this point, all of the objects remaining in the cache are rendered at Step 82, to place their data in the frame buffer 22 and complete the rendering process for one page of the image.

From the foregoing, it can be seen that the present invention increases the efficiency with which graphical objects are displayed, by eliminating unnecessary rendering operations. During each iteration, the portions of an object which are obscured by later-generated objects are removed. Thus, by the time an object is rendered, only locally visible portions remain for processing. In this context, locally visible portions refers to the portions of an object which are visible after a certain number of objects which follow it in the display list have been considered. The amount of temporal locality is determined by the size of the object cache. In the simplest embodiment, the locality is limited to two adjacent objects on the display list, which requires only a small cache memory. As the size of the cache memory is increased, the temporal locality, i.e. the number of objects on a display list that are considered together, also increases, providing further elimination of unnecessary rendering steps.

It will be appreciated by those of ordinary skill in the art that the present invention can be embodied in other specific forms without departing from the spirit or essential characteristics thereof. For example, although disclosed with specific reference to its implementation in a printer, the invention is equally applicable to any type of image output device. It can also be employed within graphics application programs which process image data before storing it, to thereby eliminate unnecessary processing steps. Further, it is not necessary that a display list, or other intermediate form of image data storage, be employed. The data for individual objects can be fed directly to the buffer from the interpreter or other device or program which issues calls that describe objects. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for generating a graphic image, comprising the steps of:

generating data which describes objects in the graphic image;

storing the data for multiple objects in a memory;

comparing the stored data for a first object with data for a second object to identify any area of intersection of said objects;

modifying the stored data for the first object by removing and identified area of intersection;

repeating said comparing and modifying steps for successive objects whose data is stored in the memory;

determining whether said memory is full;

rendering the modified stored data for the first object, to create a pixel map which defines portions of said object that are not obscured by said second object, when the memory is determined to be full; and creating an image in accordance with the rendered data.

2. The method of claim 1 further including the step of replacing the data in said memory for said first object with the data for said second object after said modifying step.

3. The method of claim 1 wherein said first object, whose modified data is rendered, is an object whose data has been stored in said memory for the longest period of time when the memory is determined to be full.

4. A graphic imaging system, comprising:

means for generating data which describes objects in an image;

a memory for storing data pertaining to a plurality of objects;

means for comparing data pertaining to a first object with the data for a second object and modifying the data for the first object to remove any common areas of said first and second objects;

means for determining when said memory is full;

means for selecting data for one of the objects stored in said memory when the memory is determined to be full;

a rendering device for creating a pixel map corresponding to the modified data for the selected object; and an image output device for generating an image in accordance with the pixel map.

5. The graphic imaging system of claim 4 wherein the data that is selected pertains to an object whose data has been stored in the memory the longest.

6. The graphic imaging system of claim 4 wherein said image output device comprises a print engine for a printer.

7. The graphic imaging system of claim 4 wherein said image output device comprises a computer monitor.

8. A method for producing an image containing multiple objects, comprising the following steps:

storing data in a first memory which describes the area covered by each of plural objects in the image;

retrieving data from said first memory that describes the area covered by a first object and storing said data in a second memory;

retrieving data from said first memory that describes the area covered by a second object;

determining whether there is a common area of intersection for the areas covered by said first and second objects;

modifying the data stored in said second memory to remove the common area of intersection from the description of the area covered by said first object;

rendering the modified data stored in said second memory that describes the area covered by the first object; and generating an image in accordance with the rendered data.

9. A method for producing an image containing multiple objects, comprising the following steps:

a) storing data in a first memory which describes the area covered by each of plural objects in the image;

b) retrieving data from said first memory that describes the area covered by a first object and storing said data in a second memory;

c) retrieving data from said first memory that describes the area covered by a second object;

d) determining whether there is a common area of intersection for the areas covered by said first and second objects;

e) modifying the data stored in said second memory to remove the common area of intersection from the description of the area covered by said first object;

f) repeating steps c), d) and e) for successive objects whose data is stored in said first memory;

g) rendering the modified data stored in said second memory that describes the area covered by the first object; and h) generating an image in accordance with the rendered data.

10. The method of claim 9 wherein the data that is retrieved for each of the objects is stored in said second memory and modified in accordance with the data of successive objects, and further including the steps of determining when said second memory is full, selecting the modified data for one of said objects, and rendering the data for the selected object in step g).

11. The method of claim 10, wherein the selected object is the object whose data has been stored in said second memory for the longest period of time.

* * * * *

UNITED STATES PATENT AND TRADEMARK OFFICE
CERTIFICATE OF CORRECTION

PATENT NO. : 6,268,859 B1
DATED : July 31, 2001
INVENTOR(S) : Kevin W. Andresen et al.

It is certified that error appears in the above-identified patent and that said Letters Patent is hereby corrected as shown below:

<u>Column 6,</u>
Line 41, please delete "and" and insert -- any -- in its place.

Signed and Sealed this

Third Day of September, 2002

Attest:

Attesting Officer

JAMES E. ROGAN
*Director of the United States Patent and Trademark Office*